No. 738,097. PATENTED SEPT. 1, 1903.
C. J. CALEY.
BALL BEARING WASHER.
APPLICATION FILED JUNE 1, 1903.
NO MODEL.
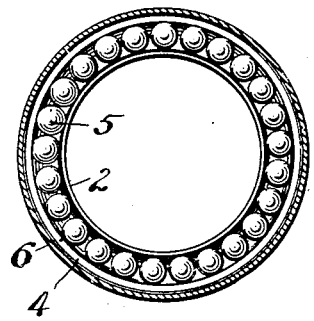
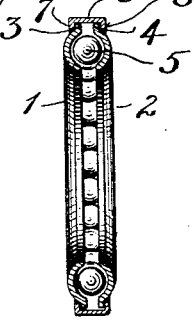 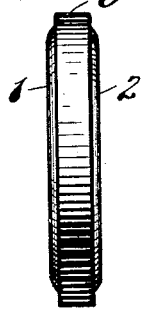
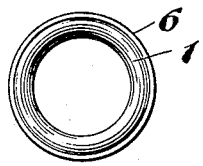

No. 738,097. Patented September 1, 1903.

UNITED STATES PATENT OFFICE.

CHARLES J. CALEY, OF NEW BRITAIN, CONNECTICUT, ASSIGNOR TO RUSSELL & ERWIN MANUFACTURING COMPANY, OF NEW BRITAIN, CONNECTICUT, A CORPORATION OF CONNECTICUT.

BALL-BEARING WASHER.

SPECIFICATION forming part of Letters Patent No. 738,097, dated September 1, 1903.

Original application filed April 25, 1903, Serial No. 154,238. Divided and this application filed June 1, 1903. Serial No. 159,477. (No model.)

*To all whom it may concern:*

Be it known that I, CHARLES J. CALEY, a citizen of the United States, residing at New Britain, in the county of Hartford, State of Connecticut, have invented certain new and useful Improvements in Ball-Bearing Washers, of which the following is a full, clear, and exact description.

My invention relates to improvements in antifriction-bearings, and particularly to an antifriction-washer which may be used in connection with a door-knob-shank bearing, such as set forth in my former application, Serial No. 154,238, filed April 25, 1903, of which application this is a division. The antifriction-washer is also applicable to use in other mechanical devices; and it has for its object the provision of a means which may be inserted between two parts which rotate relatively to each other so as to permit said parts to move freely. Incidentally, the construction is economical, durable, and efficient.

In the drawings, Figure 1 is a sectional view of one portion of the device, showing the antifriction-balls in elevation as well as one of the raceway-plates. Fig. 2 is a vertical cross-section. Fig. 3 is an elevation of the edge of the washer. Fig. 4 is an end elevation of the complete device on a reduced scale relatively to the figures previously referred to.

The several details of this washer comprise two raceway-plates 1 2 of annular form. These plates are preferably formed of sheet metal suitably tempered. The edge of each plate 1 2 is extended to form flanges 3 4. Each raceway-plate 1 2 is so shaped as to form a ball-receiving channel, the balls being indicated at 5. The flanges 3 4, extended from the edges of the plates 1 2, are comparatively close together and yet separated sufficiently far so that they will not frictionally engage.

6 is an annular holding-ring having flanges 7 8 at opposite edges thereof which overstand the flanges 3 4 of the raceway-plates 1 2, so as to loosely embrace each of said flanges and prevent accidental displacement of said plates, incidentally preventing the antifriction-balls 5 from falling out when the parts are once assembled. It will be observed that the holding-ring 6 is of less width than the thickness of the washer when completed. This is best seen in Figs. 2 and 3. The body or properly the end of each plate 1 2 is therefore extended into a plane outside of the holding-ring 6, and hence each raceway-plate may be rotated independently of the holding-ring 6. This makes it immaterial which way the washer is inserted between the two parts to be supported. The holding-ring 6 may be made of any suitable metal, its function being mainly to loosely hold the raceway-plates together, yet it also performs the function of covering the space between the plates and to a certain degree protects the antifriction devices from dust and grit. The thrust, tilting, twisting, or turning of either one of the devices which bears against either of the raceway-plates 1 or 2 is taken by the antifriction-balls, and hence friction is reduced to a minimum.

The device may be used advantageously wherever it is desired to eliminate friction between two parts which have a rotative movement relative to each other.

What I claim is—

An antifriction - washer comprising, two raceway-plates having oppositely-faced channels therein on their adjacent faces, antifriction-balls located in the channels, and an endless holding-ring, each edge of said ring being turned down to form a continuous covering, protecting and holding flange about the outer edges of said plates, the outer surface of each of said raceway-plates being exposed so that they may each turn independently of the holding-ring.

Signed at New Britain, Connecticut, this 28th day of May, 1903.

CHAS. J. CALEY.

Witnesses:
M. S. WIARD,
F. E. SUNBURN.